April 27, 1954 W. S. PIKE ET AL 2,677,098
COUPLING CIRCUITS
Original Filed March 6, 1951
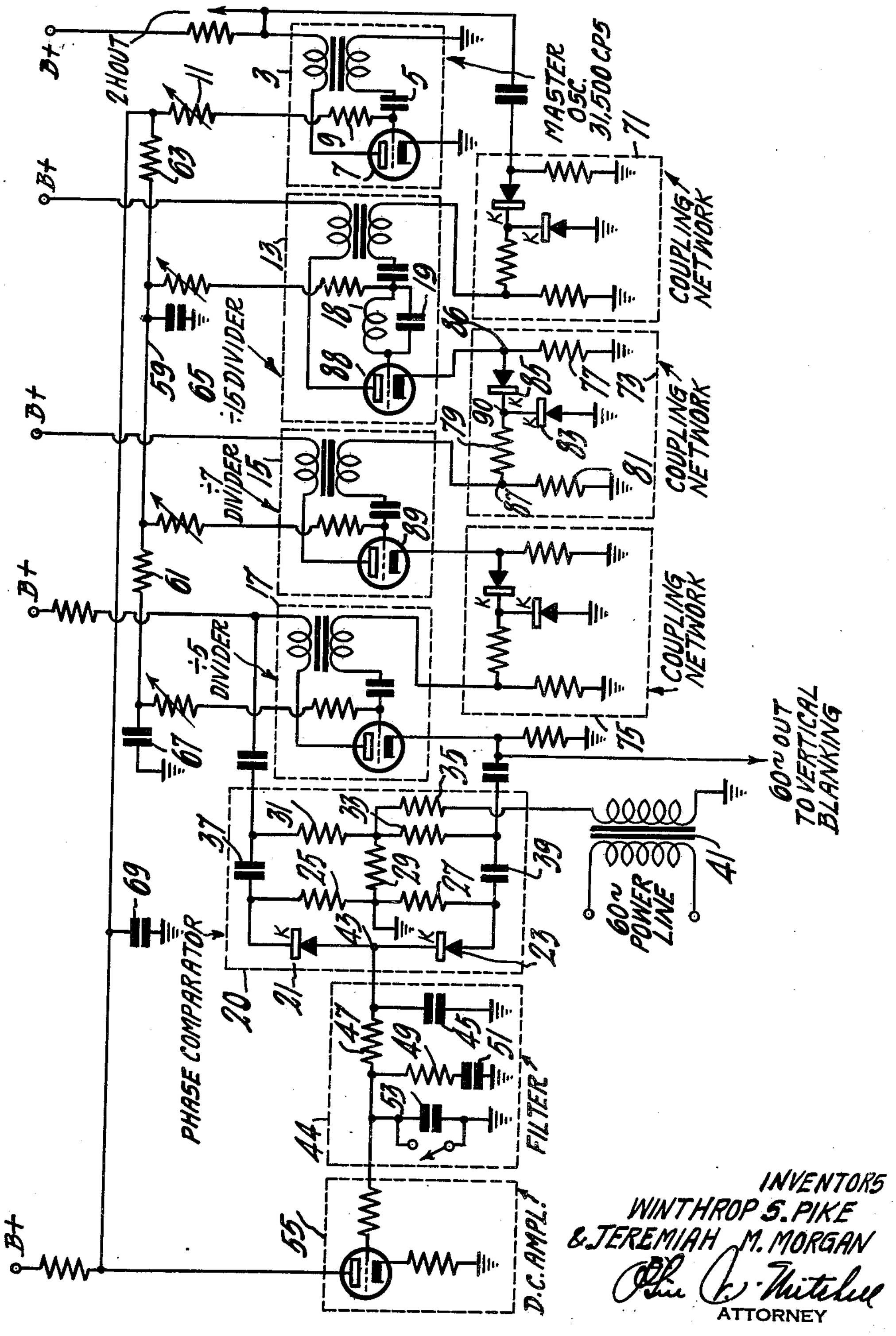
INVENTORS
WINTHROP S. PIKE
& JEREMIAH M. MORGAN
BY
ATTORNEY Patented Apr. 27, 1954 2,677,098

UNITED STATES PATENT OFFICE 2,677,098

COUPLING CIRCUITS

Winthrop S. Pike, Princeton, and Jeremiah M. Morgan, Cranbury, N. J., assignors to Radio Corporation of America, a corporation of Delaware Original application March 6, 1951, Serial No. 214,062. Divided and this application November 30, 1951, Serial No. 259,106

4 Claims. (Cl. 323—74)

This invention relates to electronic synchronization circuits and more particularly, although not exclusively, to synchronizing signal generators for television transmitters. This is a division of U. S. application Serial Number 214,062, filed March 6, 1951, and entitled "Signal Generators."

There are some fields of the electronic art such as television in which it is highly desirable to have a synchronizing signal genrator that is as light, as compact, as easily portable, and as little power-consuming as possible, without impairing its operating qualities. One of these fields is that of "industrial television," in which as small cable-linked television transmitter and receiver arrangement is used for various applications such as class room demonstrations where the transmitter camera is coupled to a microscope, operating room demonstrations in hospitals, control room telemetering, etc. Another of these fields is that of television broadcasting from a point remote from a broadcasting station in on-the-spot reporting of sporting events, parades, and other remote pickups.

One form of television synchronizing signal generators to which this invention is applicable usually comprises a master oscillator of the relaxation oscillator type, a chain of frequency dividers, and an automatic frequency control system. This automatic frequency control system usually comprises a frequency comparator circuit which compares the divided frequency output of the master oscillator to the local public utility power line frequency. The comparison circuit may take a variety of forms, but most generally comprises a bridge-rectifier type of comparator circuit well known in the art and described, for example, in the January 1943 issue of "The Proceedings of the I. R. E." in an article entitled "Automatic frequency and phase control of synchronization in television receivers" by K. R. Wendt and G. L. Fredendall. The output voltage of such a bridge-rectifier type comparator circuit is unidirectional in nature and is generally applied to the control electrode of one of the electron discharge tubes of the master oscillator. Buffer amplifiers are generally used to prevent cross coupling between the master oscillator and the dividers, and between the dividers themselves, in order to prevent extraneous voltages from being coupled into the divider circuits. These extraneous voltages would result in a tendency for the dividers to provide synchroninzation at frequencies other than the desired frequencies.

An object of this invention is to provide a simplified signal generator.

Another object of this invention is to provide a television synchronizing signal generator that is easily portable and which consumes very little power.

A further object of this invention is to provide a signal generator of improved frequency stability.

According to this invention the unidirectional output of the frequency comparator circuit is applied not only to the master oscillator circuit, but also to at least one of the frequency dividers. Cross coupling between the master oscillator and the divider stages and between the divider stages themselves is attenuated by means of a unidirectional coupling network comprising a series diode, a shunt diode, and an isolating resistor.

Other and incidental objects of this invention will be apparent to those skilled in the art from a reading of the following specification and an inspection of the accompanying drawing, in which there is shown a schematic diagram of a synchronizing signal generator constructed in accordance with this invention.

Referring now to the drawing, there is illustrated in the dotted line area 3 a relaxation oscillator used here as the master oscillator of the synchronizing signal generator. This relaxation oscillator is shown here as a blocking oscillator. According to usual television practice, the master oscillator 3 is designed to generate a series of oscillations occurring at a frequency of 31,500 cycles per second. The general operation of blocking oscillators will not be explained here as it is well known and is set forth in texts such as Section 6 of Terman's "Radio Engineers' Handbook" published by McGraw-Hill in 1943. However, some details of their operation will be set forth below to facilitate the understanding of some aspects of this invention. A blocking oscillator is a device that operates to cut itself off after one or more cycles because of the accumulation of a negative charge on a capacitor 5 in series with the control electrode or grid of the electron discharge tube 7. In any oscillator in which the grid swings positive, electrons are attracted towards the grid. These electrons accumulative on the conducting surface of the grid capacitor 5 nearest the control grid. The electrons cannot return to the cathode of tube 7 through the tube, but must choose a path through the grid leak resistors 9 and 11. The electrons will accumulate at the grid capacitor faster than the grid resistors will permit them to return to the cathode, provided that the grid resistors are of large value. Therefore, a negative charge accumulates at the grid which can bias the tube 7 to plate current cut-off if the grid swing is high enough. Once the tube is cut off, it allows no additional electrons to reach the grid capacitor. When cut-off occurs, however, accumulated electrons at the grid capacitor continue to flow through the grid leak resistors, reducing the negative grid potential. This results in the tube again conducting and the operational cycle just described repeats itself.

The 31,500 C. P. S. output of the master oscillators 3 is applied, in accordance with conventional practice, to the input of a chain of frequency dividers 13, 15, and 17 which derive indicating signals bearing a fixed 525:1 timing relationship to the master oscillator frequency. The frequency dividers 13, 15 and 17 are blocking oscillators whose mode of operation is similar to that of the master oscillator 3. One of these oscillators has been shown provided with a resonant stabilizer comprising inductance 18 and capacitor 19. The frequency divider chain derives indicating signals having a repetition rate of 60 C. P. S. These signals are applied in push-pull connection across one arm of the bridge-rectifier frequency or phase comparator circuit 20 which comprises diodes 21 and 23, resistors 25, 27, 29, 31, 33, and 35, and capacitors 37 and 39. This form of comparator circuit is well known in the art and its mode of operation is fully described in the previously referred to article by K. R. Wendt and G. L. Fredendall appearing in the January 1943 issue of "The Proceedings of the I. R. E." Local 60 cycles power line frequency standardizing signals are applied through suitable terminals and resistor 35 to the center of the bridge comparator circuit by means of transformer 41. The unilateral potential appearing at the junction 43 of diodes 21 and 23 varies in accordance with the frequency and phase difference between the 60 cycle power line synchronizing signal and the indicating signal derived by the frequency divider chain. This unilateral control potential is filtered by means of filter 44 comprising elements 45, 47, 49, 51, and 53, and amplified by a D. C. amplifier 55. This amplified control potential is applied by means of lead 57 to the control electrode of the master oscillator 3, and, according to this invention, is also applied by means of lead 59 to the control electrode of the electron discharge tube of at least one but preferably all of the frequency dividers 13, 15, and 17. This control potential changes the rate at which electrons can flow through the grid leak resistors of the oscillators, and therefore also changes the interval between the time the oscillator tube cuts off and starts conducting again. The operating frequency of the master oscillator and the frequency dividers can thus be rigidly controlled. Resistors 61 and 63 and capacitors 65, 67, and 69 are provided to prevent A. C. coupling between the oscillators over leads 57 and 59.

Cross coupling between the blocking oscillators is attenuated by means of unidirectional coupling networks 71, 73, and 75. The operation of these coupling networks is similar in both cases, and the operation of only one of them will be explained. Coupling network 73 comprises resistors 77, 79, and 81 and diodes 83 and 85. Terminal point 86 and a point of constant potential, shown in the drawing as "ground," may be considered as the input terminals of the unidirectional coupling network 73, while point 87 and "ground" may be regarded as its output terminals. Terminal 86 is connected to an electrode of tube 88 of divider 13. Terminal 87 is connected to the control electrode of tube 89 of divider 15. Resistor 77 is connected between terminal 86 and "ground." Resistor 81 is connected between terminal 87 and ground. Diode 85 and an isolating resistor 79 are connected between terminals 86 and 87 through junction point 90; the diode 85 being placed between point 90 and terminal 86 and with its anode connected to terminal 86; the isolating resistor 79 being placed between point 90 and terminal 87. Diode 83 is connected between point 90 and "ground," with its anode connected to "ground."

When tube 88 of divider 13 is conducting, its cathode swings positive. A positive pulse appearing at point 86 will go through diode 85. Diode 83 will not conduct and the pulse will reach the next divider 15. A negative pulse appearing at point 86 would not go through the coupling circuit as diode 85 would not conduct. A positive pulse from divider 15 appearing at point 87 will not go through the coupling network as neither diode 83 nor diode 85 will conduct; that positive pulse will go to ground through resistor 81. A negative pulse appearing at point 87 would be attenuated by resistor 79 before reaching junction point 90. From junction 90 it would go through both diodes 83 and 85, but a greater part would go through diode 83 than through diode 85 as diode 83 offers a low impedance path to ground. Only a very small part of the pulse would go through the coupling network to the divider 13. Back coupling is therefore greatly attenuated. Diodes 83 and 85 may be small crystal rectifiers.

The particular frequencies indicated above are for illustrative purposes only and it is not intended to restrict the invention to those values listed. Other frequency values and other dividing values may be employed in the practice of this invention with equal advantage.

Having thus described our invention, what is claimed is:

1. A unidirectional coupling network comprising a first diode having an anode and a cathode, a connection including a first resistor between the anode of said first diode and a point of fixed potential, a second diode having an anode and a cathode, a connection between the cathode of said first diode and the cathode of said second diode, a connection between the anode of said second diode and said point of fixed potential for maintaining the anode of said second diode at said fixed potential, and a connection including a second resistor betweeen the cathodes of said first and second diodes and said point of fixed potential, the junction of said first resistor and said anode of said first diode comprising a signal input terminal for said network, and a signal output terminal at the end of said second resistor remote from said point of fixed potential.

2. A unidirectional coupling network having input terminals and output terminals and wherein one of said input terminals and one of said output terminals are connected to a point of uniform constant potential, comprising a resistor and a first diode having an anode and a cathode connected between the other of said input terminals and the other of said output terminals such that the anode of said first diode is connected to the last mentioned input terminal and said resistor connected to the last named output terminal, a second diode having an anode and a cathode and connected between a point intermediate said first diode and said resistor and said point of uniform constant potential such that the anode of said second diode is connected to said point of uniform constant potential, a resistor connected between said input terminals, and a resistor connected between said output terminals, such that said network provides a direct, substantially non-attenuating path from said input terminals to said output terminals for a signal of polarity more positive than said uniform constant potential and a substantially attenuating path for signals applied to said output terminals.

3. A unidirectional coupling network comprising a diode having a first electrode and a second electrode; a connection including a resistor between the second electrode of said first diode and a point of fixed potential; a second diode having corresponding first and second electrodes; a connection between the first electrode of said first diode and the first electrode of said second diode; a connection between the second electrode of said second diode and said point of fixed potential for maintaining said electrode at said fixed potential; and a connection including a resistor between said point of fixed potential and the first electrodes of said first and second diodes, the junction of said first resistor and said second electrode of said diode comprising a signal input terminal for said network, and a signal output terminal at the end of said last-named resistor remote from said point of fixed potential.

4. A unidirectional coupling network having input terminals and output terminals and wherein one of said input terminals and one of said output terminals are connected to a point of uniform constant potential, comprising a resistor and a first diode having a first electrode and a second electrode connected between the other of said input terminals and the other of said output terminals such that the first electrode of said first diode is connected to the last mentioned input terminal and said resistor connected to said last named output terminal, a second diode having corresponding first and second electrodes and connected between a point intermediate said first diode and said resistor and said point of uniform constant potential such that the first electrode of said second diode is connected to said point of uniform constant potential, a resistor connected between said input terminals and a resistor between said output terminals, such that said network provides a direct, substantially non-attenuating path from said input terminals to said output terminals for a signal of predetermined polarity with respect to said uniform constant potential and a substantially attenuating path for signals applied to said output terminals.

References Cited in the file of this patent

UNITED STATES PATENTS

| Number | Name | Date |
|---|---|---|
| 2,342,238 | Barney | Feb. 22, 1944 |
| 2,511,468 | Harrison | June 13, 1950 |
| 2,535,303 | Lewis | Dec. 26, 1950 |
| 2,550,715 | Norton | May 1, 1951 |